US011875919B2

(12) United States Patent
Ghosh et al.

(10) Patent No.: US 11,875,919 B2
(45) Date of Patent: Jan. 16, 2024

(54) MULTILAYER ELECTRIC FIELD GRADING ARTICLE, METHODS OF MAKING THE SAME, AND ARTICLES INCLUDING THE SAME

(71) Applicant: 3M INNOVATIVE PROPERTIES COMPANY, St. Paul, MN (US)

(72) Inventors: Dipankar Ghosh, Oakdale, MN (US); John Phan, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 320 days.

(21) Appl. No.: 17/438,315

(22) PCT Filed: Feb. 19, 2020

(86) PCT No.: PCT/IB2020/051406

§ 371 (c)(1),
(2) Date: Sep. 10, 2021

(87) PCT Pub. No.: WO2020/188371

PCT Pub. Date: Sep. 24, 2020

(65) Prior Publication Data

US 2022/0189654 A1 Jun. 16, 2022

Related U.S. Application Data

(60) Provisional application No. 62/819,805, filed on Mar. 18, 2019.

(51) Int. Cl.
*H01B 3/00* (2006.01)

(52) U.S. Cl.
CPC .................................... *H01B 3/004* (2013.01)

(58) Field of Classification Search
CPC .................................. H01B 3/00; H01B 3/004
USPC ......................................................... 174/209
See application file for complete search history.

(56) References Cited

U.S. PATENT DOCUMENTS 4,207,482 A 6/1980 Neumeyer et al.
4,234,439 A 11/1980 Kehr
(Continued)

FOREIGN PATENT DOCUMENTS

CN 107077918 A 8/2017
WO WO 2011-081795 7/2011
(Continued)

OTHER PUBLICATIONS

Donzel, "Silicone Composites for HV Applications based on Microvaristors", IEEE International Conference on Solid Dielectrics (ICSD), Toulouse, France, Jul. 5-9, 2004, vol. 1, pp. 403-406.
(Continued)

*Primary Examiner* — Tremesha S Willis
(74) *Attorney, Agent, or Firm* — Bradford B. Wright

(57) ABSTRACT

A multilayer electric field grading article comprises first and second layers forming a discrete interface. The first layer comprises a first electric field grading composition comprising first particles dispersed in a first matrix material. The second layer comprises a second electric field grading composition comprising second particles, compositionally different than the first particles, dispersed in a second matrix material. The first and second layers have respective first and second degrees of nonlinearity between respective first and second onset voltages and corresponding first and second breakdown voltages. The first and second layers taken together have a combined onset voltage that is higher than the first and second onset voltages, and the first and second layers taken together have a greater combined degree of nonlinearity than each of the first and second degrees of nonlinearity taken individually. A method of reducing electric field stress at a joint or termination of a substrate includes applying the multilayer electric field grading article to a surface of a substrate.

20 Claims, 6 Drawing Sheets

(56) References Cited

U.S. PATENT DOCUMENTS

| | | | |
|---|---|---|---|
| 4,363,842 | A | 12/1982 | Nelson |
| 4,431,861 | A | 2/1984 | Clabburn |
| 4,470,898 | A | 9/1984 | Penneck |
| 5,492,681 | A | 2/1996 | Pasek |
| 6,124,549 | A | 9/2000 | Kemp |
| 6,228,767 | B1 | 5/2001 | Yakura |
| 8,435,427 | B2 | 5/2013 | Ghosh |
| 8,974,706 | B2 | 3/2015 | Somasiri |
| 9,349,498 | B2 | 5/2016 | Lottes |
| 9,704,613 | B2 | 7/2017 | Ghosh |
| 9,876,342 | B2 | 1/2018 | Ghosh |
| 10,121,570 | B2 | 11/2018 | Somasiri et al. |
| 2011/0140052 | A1 | 6/2011 | Somasiri |
| 2016/0218498 | A1 | 7/2016 | Ghosh |

FOREIGN PATENT DOCUMENTS

| | | |
|---|---|---|
| WO | WO 2015-047769 | 4/2015 |
| WO | WO 2018-081394 | 5/2018 |
| WO | WO 2018-102254 | 6/2018 |
| WO | WO 2019-220345 | 11/2019 |

OTHER PUBLICATIONS

Ghosh, "Embedded nonlinear passive components on flexible substrates for microelectronics applications", Journal of Materials Science: Materials in Electronics, 2017, vol. 28, No. 15, pp. 11550-11556.

Lin, "Grain boundary behavior in varistor-capacitor $TiO_2$-rich $CaCu_3Ti_4O_{12}$ ceramics", Journal of Applied Physics, 2008, vol. 103, pp. 074111-1-074111-5.

International Search Report for PCT International Application No. PCT/IB2020/051406, dated May 7, 2020, 4 pages.

MULTILAYER ELECTRIC FIELD GRADING ARTICLE, METHODS OF MAKING THE SAME, AND ARTICLES INCLUDING THE SAME

CROSS REFERENCE TO RELATED APPLICATIONS

This application is a national stage filing under 35 U.S.C. 371 of PCT/IB2020/051406, filed Feb. 19, 2020, which claims the benefit of Provisional Application No. 62/819,805, filed Mar. 18, 2019, the disclosure of which is incorporated by reference in its/their entirety herein.

TECHNICAL FIELD

The present disclosure broadly relates to electric field grading compositions and assemblies, methods of using them, and articles including them.

BACKGROUND

Electric field grading, or electrical stress control, refers to the technique of reducing local enhancements of the electric field in various devices, especially electrical power cable accessories such as terminations and splices. Electrical field grading is especially important as voltage levels of components are increasing and sizes of components are shrinking. Criteria such as cost, safety issues, low electric fields, and temperatures are often contradictory. For example, thinner insulation leads to lower material costs and lower temperatures but to higher electric fields, which can lead to electric breakdown and failure, particularly at critical regions such as interfaces or triple points. Appropriate field grading can help attain or improve and optimize a design that appropriately balances such criteria.

Field grading methods generally fall into two main classes: a) capacitive field grading (e.g., geometrical electrode grading with appropriate shape of conductive parts, refractive grading with high-permittivity materials, and condenser grading with integration of metallic elements); and b) resistive field grading, using special materials with appropriate current-field characteristics. This simple classification is based on whether the displacement (e.g., capacitive current or resistive current) dominates the field grading mechanism.

Resistive field grading materials generally become more conductive at elevated levels of electric field values. Usually, capacitive field grading materials have relatively high dielectric constant and low dielectric loss. Both kinds of materials can avoid failure at the critical region by redistributing the electrical field at extreme conditions.

U.S. Pat. No. 8,974,706 (Somasiri et al.) describes electrical stress control technology using conductive carbon black and high dielectric constant ceramic barium titanate/polymer multilayers.

The electrical conductivity of such compositions may depend on percolation properties of the conductive filler particles (e.g., the resistivity of such materials is very sensitive on small fluctuations of parameters that influence particle dispersion), and thus processing and manufacturing parameters typically need to be carefully controlled for making such compositions.

U.S. Pat. No. 6,124,549 (Kemp et al.) discloses another approach based on using varistor (i.e., variable resistor) powder (e.g., doped ZnO) and filler particles materials disposed in a polymeric matrix. Relatively high particle loading levels in systems of this type are generally required to see electric field switchable properties of the multilayers.

SUMMARY

The present disclosure provides another approach for electrical stress control using a multilayer electric field grading article. The multilayer electric field grading article includes a layered plurality of electric field grading compositions. Each electric field grading composition shows reproducible nonlinear electric field switchable electrical conductivity with respect to applied electric field. Advantageously, the layered construction can result in synergistic electric field grading performance that is better (e.g., higher onset voltage for nonlinear conductivity and a higher degree of nonlinearity (i.e., a higher power law coefficient (a) value that defines the rate of change of electrical conductivity with respect to applied voltage when voltage applied is between the onset voltage and the breakdown voltage) than each of the individual layers of respective electric field grading compositions. Higher onset voltage typically leads to a higher irreversible breakdown voltage which is particularly useful for high voltage applications. Also, higher values of the power law coefficient can be useful while designing electrical stress mitigation accessories such as terminations and splices.

In a first aspect, the present disclosure provides a multilayer electric field grading article comprising:

a first layer comprising a first electric field grading composition, the first electric field grading composition comprising first particles dispersed in a first matrix material, wherein the first layer has a first degree of nonlinearity that occurs between a first onset voltage and a first breakdown voltage;

a second layer disposed on the first layer and comprising a second electric field grading composition, the second electric field grading composition comprising second particles dispersed in a second matrix material, wherein the second layer has a second degree of nonlinearity that occurs between a second onset voltage and a second breakdown voltage, and wherein the second particles are compositionally different from the first particles; and a discrete interface formed by intimate contact of the first and second layers, wherein the first and second layers taken together have a combined degree of nonlinearity that occurs above a combined onset voltage that is higher than the first and second onset voltages, and wherein the first and second layers taken together have a greater combined degree of nonlinearity than each of the individual first and second degrees of nonlinearity taken individually.

In a second aspect, the present disclosure provides a method of reducing electric field stress at a joint or termination of a conductive substrate, the method comprising applying a multilayer electric field grading article according to the present disclosure to a surface of a conductive substrate.

As used herein:

"Electric field grading composition" means a composition having an electrical resistivity that vanes with applied voltage such that it has an electric field switchable, non-ohmic current/voltage characteristic for two directions of traversing current. Typical temperatures of operation are between −50° C. and +180° C. At low voltage levels (e.g., <850 V-900 V) the electric field grading composition has a high electrical resistivity which decreases as the voltage is raised beyond the onset voltage (e.g., to 900 V-1000 V) but below the dielectric breakdown voltage.

"Irreversible breakdown voltage" refers to that voltage at which irreversible decomposition occurs.

"Onset voltage" (also threshold voltage) refers to that voltage above which non-ohmic current/voltage characteristic for two directions of traversing current is observed. Onset voltage is always below the irreversible breakdown voltage.

"Degree of nonlinearity" (i.e., $\alpha$ value) refers to the power law coefficient that defines the non-ohmic current/voltage characteristics between the onset voltage and the irreversible breakdown voltage.

Features and advantages of the present disclosure will be further understood upon consideration of the detailed description as well as the appended claims.

Figure 1:
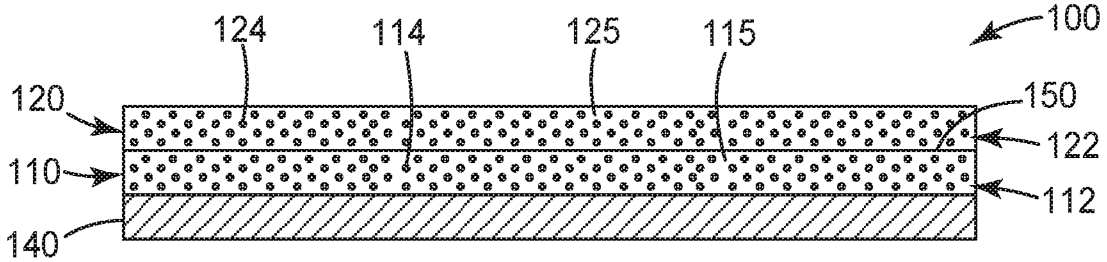
FIG. 1 is a schematic side view of an exemplary multilayer electric field grading article 100 according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Multilayer electric field grading articles according to the present disclosure comprise first and second layers, optionally disposed on a backing. Each one of the first and second layers comprises respective first and second compositionally different particles disposed in respective first and second matrix materials.

Referring now to FIG. 1, multilayer electric field grading article 100 comprises first layer 110 and second layer 120. First layer 110 is disposed on optional backing 140. First layer 110 comprises first electric field grading composition 112, which comprises first particles 114 dispersed in first matrix material 115. First layer 110 has a first degree of nonlinearity. Second layer 120 is disposed on first layer 110 thereby forming discrete interface 150. Second layer 120 comprises second electric field grading composition 122. Second electric field grading composition 122 comprises second particles 124 dispersed in second matrix material 125. Second layer 120 has a second degree of nonlinearity. First and second particles 114, 124 are compositionally different. First and second layers 110, 120 taken together have a combined onset voltage that is higher than the first and second onset voltages, and the first and second layers taken together have a greater combined degree of nonlinearity than each of the first and second degrees of nonlinearity taken individually.

Figure 2:
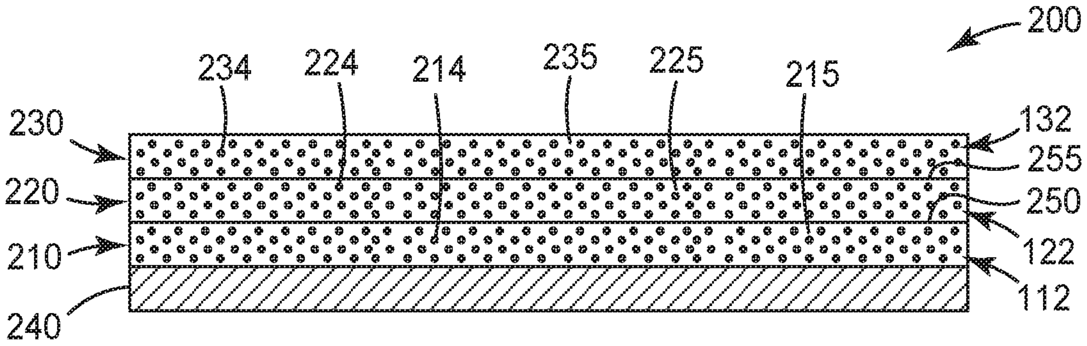
FIG. 2 is a schematic side view of another exemplary multilayer electric field grading article 200 according to the present disclosure.

In another embodiment shown in FIG. 2, a sandwich construction multilayer electric field grading article 200 comprises first layer 210, second layer 220, and third layer 230 (which is the same as, or different than, first layer 210). First layer 210 is disposed on optional backing 240. Second layer 220 is disposed on first layer 210. Third layer 230 is disposed on second layer 220. First layer 210 comprises first electric field grading composition 212 comprising first particles 214 dispersed in first matrix material 215. First layer 210 has a first voltage-dependent nonlinear electrical resistivity. Second layer 220 comprises second electric field grading composition 222 comprising second particles 224 dispersed in second matrix material 225. Second layer 220 has a second voltage-dependent nonlinear electrical resistivity. Third layer 230 comprises third electric field grading composition 232 comprising third particles 234 dispersed in third matrix material 235. Third layer 230 has a third voltage-dependent nonlinear electrical resistivity. First layer 210 and second layer 220, and second layer 220 and third layer 230 form respective discrete interfaces 250 and 255. First particles 214 and second particles 224 are compositionally different. First and second layers 210, 220 taken together have a combined onset voltage that is higher than the first and second onset voltages. First and second layers 210, 220 taken together have a greater combined degree of nonlinearity than each of the first and second degrees of nonlinearity taken individually.

Still other configurations involving any number of additional layers, which may be the same or different than other layers, are also contemplated. For example, a third layer comprising third particles which are different from the first and second particles, may be disposed on the second layer thereby forming a second interface. Likewise, configurations having alternating first layer/second layer stacks totaling at least 4, at least 5, at least 6, or more layers may be used.

Electric field grading compositions used in the present disclosure include particles (e.g., first or second particles) dispersed in a matrix material. With respect to the first layer, the first particles may include semiconducting particles, which may be combined with other semiconducting and/or conducting particles. In like fashion, with respect to the second layer, the second particles may include semiconducting particles, which may be combined with other semiconducting and/or conducting particles. The particles may be shaped as flakes and/or blocky bodies resulting from crushing or milling, for example.

Exemplary suitable first and second particles include particulate compounds selected from the group consisting of: (i) compounds having a perovskite-type crystal structure; (ii) compounds having a spinel crystal structure other than $\gamma$-$Fe_2O_3$ and spinel itself, (iii) compounds having an inverse spinel crystal structure; (iv) compounds having a mixed spinel crystal structure; (v) dichalcogenides of transition metals; (vi) ferroelectric materials such as $BaTiO_3$, $BaSrTiO_3$; and (vii) $SbN_4$; and combinations thereof.

Exemplary first and second semiconducting particles include particulate cupric oxide and or doped cupric oxide. A majority of the particulate cupric oxide (e.g., at least 50 weight percent, at least 60 weight percent, at least 70 weight percent, at least 80 weight percent, at least 90 weight percent, at least 99 weight percent, or even all) is in the form of cupric oxide and/or doped cupric oxide. The copper oxide particles may have any shape. Commercially available cupric oxide is available, for example, as substantially spherical powders or as needles. In some embodiments, cupric oxide particles may have an average aspect ratio (i.e., the ratio of length to thickness) of at least 5, at least 10, at least 20, or even at least 50, for example. The electric field grading composition may have anisotropic conductivity under an applied electric field (voltage drop for fixed geometries). For example, good conductivity may be observed in X and Y directions, but not in the Z direction.

The particulate compound is typically present in the respective matrix material in an amount of at least 10% by weight based on the matrix material polymer, and in an amount such that the value of $\alpha_1$ and/or $\alpha_2$ is at least 1.5 at some electrical stress between 0.01 kV/mm and 10 kV/mm, preferably at a stress below 5 kV/mm, although this is not a requirement.

Exemplary suitable first and second particles may include particulate cupric oxide (i.e., CuO). Particulate cupric oxide may contain impurities other than cupric oxide, preferably in amounts of less than or equal to 3 percent by weight, preferably less than or equal to 2 percent by weight, more preferably less than 1 percent by weight, and even more preferably less than 0.1 percent by weight. In some cases, the impurities may be dopant(s). In the case of included dopants such as $Ga^{3+}$, $Al^{3+}$, $K^+$, $Na^+$, or $Li^+$, the dopants may alter the onset voltage at which the Power Law behavior occurs. If present, dopants are generally present at a concentration of less than 100 part per million (ppm), although his is not a requirement. Combinations of dopants may also be used. Likewise, the particulate cupric oxide may contain other impurities as long as the overall voltage-dependent nonlinear electrical resistivity of the first and/or second layer is substantially maintained.

High-purity particulate cupric oxide may be obtained from commercial sources (e.g., Sigma-Aldrich, Saint Louis, Missouri or American Elements, Los Angeles, California) or made according to known procedures, for example, as described in U.S. Pat. No. 5,492,681 (Pasek et al.).

The amount of particulate cupric oxide in the electric field grading composition may be any value that imparts an electric field switchable increasing conductance in response to increasing electric field according to the abovementioned Power Law. The amount may be affected by the particle size, particle shape, and particle orientation.

Preferably, the amount of any particulate cupric oxide present is from 5 to 50 weight percent, more preferably 10 to 40 weight percent, and even more preferably 50 to 75 weight percent, based on the total weight of the electric field grading composition although higher and lower amounts may also be used.

Exemplary first and second suitable particles can also include ceramic ferrosoferric oxide ($Fe_3O_4$). Ferrosoferric oxide ($Fe_3O_4$) may be produced from, e.g., the mineral magnetite (and is available from a variety of vendors, e.g., under CAS No. 1317-61-9). The chemical formula of ferrosoferric oxide is often characterized as $FeO.Fe_2O_3$, and it is often referred to as iron (II, III). If desired, ferrosoferric oxide may be prepared in very pure form, e.g., by the co-precipitation of iron (III) with iron (II) salts in the presence of an excess of a relatively strong base. However, it may not necessarily be required that the ferrosoferric oxide be used in a form (e.g., be subjected any particular treatment) in which trace impurities are removed (unless such impurities are found to have an adverse effect on the ability of the resulting composition to relieve electrical stress). For example, in some applications finely ground magnetite ore may be used.

In at least some embodiments, ferrosoferric oxide may be used without any particular processing (e.g., without any or all of calcining, sintering, doping, or the like) being required in order to impart the ferrosoferric oxide with acceptable resistive electric field grading properties. That is, it may merely be dispersed in an appropriate polymer matrix as described later herein. In contrast, other materials such as, e.g., zinc oxide may need to be doped to achieve a varistor effect.

The ferrosoferric oxide may comprise any suitable particle size that allows it to be acceptably dispersed into a desired polymer matrix to form a composition as disclosed herein. In various embodiments, the ferrosoferric oxide may comprise an average particle size of no more than about 200, 100, 40, or 20 microns. In further embodiments, the ferrosoferric oxide may comprise an average particle size of at least about 0.1, 1, 2, 4, 8, or 16 microns. If desired, the ferrosoferric oxide particles may comprise any suitable surface treatment or the like that enhances the ability of the particles to be dispersed into a desired polymer matrix. For example, the particles may be treated or coated with hydrophobic groups.

In various embodiments, the ferrosoferric oxide particles may make up at least about 15, 20, or 25 weight % of the composition (that is, of the total of the polymer matrix and the ferrosoferric particles, and of any other additives if present). In further embodiments, the ferrosoferric oxide particles may comprise at most about 80, 60, 40, or 30 weight % of the composition as described in U.S. Pat. No. 9,876,342 B2 (Ghosh).

In various embodiments, the first and second matrix materials are generally electrically insulating materials which may be organic or inorganic. In preferred embodiments the matrix material comprises an organic polymer. Examples of suitable organic polymers include urethane-based polymers; silicone-based polymers; EVA (ethylene-vinyl acetate) polymers; EPDM (ethylene-propylene-diene rubber); olefinic polymers (e.g., polyethylene or polypropylene); epoxy resins; polyimides, polyamides, polycarbonates, and polyesters. It is emphasized that these are merely exemplary broad categories and that any suitable polymeric material, copolymer, or blend thereof may be used.

The resulting electric field grading composition may be stiff and rigid, or it may be relatively elastomeric. However, it is not strictly necessary that the resulting composition be solid. Rather, it might be a semi-solid, grease, gel, wax, mastic, or even an adhesive (e.g., a pressure-sensitive adhesive), if desired.

Electric field grading compositions used in practice of the present disclosure may also comprise any other suitable additive(s), for example to improve processability, weatherability, and so on. Potentially useful additives may include, for example, dispersing agents, processing aids, mold release agents, stabilizers, conductive or nonconductive fillers, antioxidants, colorants, and plasticizers.

In certain embodiments, the conductive filler may be a graphene-based material (e.g., graphene, doped graphene, functionalized graphene, exfoliated graphite, graphene nanoplatelets, or graphite nanoplatelets). In some embodiments, a conductive filler may be present in the form of carbon black. However, in other embodiments, the electric field grading composition is substantially free of carbon black. In some embodiments, the electric field grading composition is substantially free of any type of conductive material. In some embodiments, one or more additional conductive materials may be present in the electric field grading composition. Any suitable particulate conductive material may be used. In some embodiments, the conductive filler particles may comprise an aspect ratio of at least about 5, 10, 100, or higher.

In some embodiments, one or more additional nonconductive (insulating) materials such, for example, as silica, alumina, zirconia, and zircoaluminates may also be present.

Electric field grading compositions used in the present disclosure may also comprise any other suitable additive(s), for example to improve processability, weatherability, and so on. Potentially useful additives may include, for example, dispersing agents, processing aids, mold release agents, stabilizers, conductive or nonconductive fillers, antioxidants, colorants, and plasticizers. In certain embodiments, the conductive filler may be a graphene-based material (e.g., graphene, doped graphene, functionalized graphene, exfoliated graphite, graphene nanoplatelets, or graphite nanoplatelets). In some embodiments, a conductive filler may be present in the form of carbon black. However, in other embodiments, the electric field grading composition is substantially free of carbon black. In some embodiments, the electric field grading composition is substantially free of any type of conductive material. In some embodiments, one or more additional conductive materials may be present in the electric field grading composition. Any suitable particulate conductive material may be used. In some embodiments, the conductive filler particles may comprise an aspect ratio of at least about 5, 10, 100, or higher.

In some embodiments, electric field grading compositions according to the present disclosure may optionally further comprise one or more additional electrically nonconductive (electrically insulating) materials such as, for example, a high dielectric permittivity ceramic material having a dielectric permittivity value greater than 50 (preferably greater than 75, and more preferably greater than 100). Examples include barium titanate, titanium oxide, barium strontium titanate, and strontium titanate.

In some embodiments, one or more additional conductive materials may be present in the electric field grading composition. Any suitable particulate conductive material may be used. In some embodiments, the conductive filler particles may comprise an aspect ratio of at least about 5, 10, 100, or higher.

The particle size of any such additive that is active in performing electric field grading may be chosen as desired. In various embodiments, such an additive may comprise an average particle size of no more than about 200, 100, 40, or 20 microns. In further embodiments, such an additive may have an average particle size of at least about 0.1, 1, 2, 4, 8, or 16 microns. If desired, any such additive may comprise any suitable surface treatment or the like that enhances the ability of the particles to be dispersed into a desired polymer matrix. For example, the particles may be treated or coated with hydrophobic groups. In some embodiments, an electric field grading composition may include nanoparticles, in the general manner as described in U.S. Pat. Appln. Publ. 2011/0140052 (Somasiri).

Electric field grading compositions may be dissolved and/or suspended in an organic solvent to facilitate processing (e.g., if the is electric field grading composition is not fluid); however, most or all solvent is typically removed before use in a finished electronic article.

Electric field grading compositions may generally be made by simple mixing of the components (e.g., matrix material or a precursor thereof, mixed metal oxide, and any optional ingredients). If desired, organic solvent may be used to reduce viscosity, although it should typically be subsequently removed after compounding, and optionally coating. If a matrix material precursor (e.g., a curable organic resin) is included, then a curing step or steps may be included before and/or after removal of the solvent. Examples of suitable solvents include ethers, ketones, esters, and halocarbons.

The first and second matrix materials typically form a continuous phase in which the respective first and second particles are dispersed.

The amount of first and second particles in the respective first and second matrix materials may be any value that imparts a nonlinear increasing conductance in response to increasing electric field. In some preferred embodiments, the first and second particles are the same, and in others they are different. For example, in one preferred embodiment the first particles comprise $Fe_3O_4$, and the second particles comprise CuO.

The amount may be affected by the particle size, shape, and/or orientation. Preferably, any flakes contained in the first and/or second particles are oriented substantially parallel to each other, although this is not a requirement. For example, a majority of particulate flakes (e.g., at least 50 weight percent, at least 60 weight percent, at least 70 weight percent, at least 80 weight percent, at least 90 weight percent, at least 99 weight percent, or even all) may be aligned substantially parallel (e.g., within 15 degrees, 10 degrees, or even 5 degrees) to one another. Preferably, the amount of the first and second particles in the respective first and second layers, is from 5 to 50 weight percent, more preferably 10 to 40 weight percent, and even more preferably 15 to 30 weight percent, based on the total weight of the electric field grading composition, although this is not a requirement Any solid substrate may be used; however, electric field grading articles compositions used in the present disclosure are advantageously used on substrate that are conducting and preferably capable of carrying a substantial current load and high voltage. Examples include exposed power cables (e.g., cable splices and cable terminations), and interior surfaces of switch housings (e.g., gas insulator switch housings). Electric field grading compositions according to the present disclosure may also be useful in surge protectors due to their nonlinear conductivity.

The electric field grading compositions of the present disclosure can be used in various articles for various applications, e.g., spray, coating, mastics, tapes, and shaped bodies having a definite configuration. The electric field grading compositions of the present disclosure are particularly suitable for use in electrical stress control elements or devices such as high voltage cable accessories, wherein the nonlinear dielectric properties of the compositions are useful.

Electrical stress control devices can be manufactured which are designed with respect to their dielectric properties and their geometric configurations in accordance with desirable modifications of an electric field present at the respective site of application. These stress control devices consist at least partly of the composition of the disclosure. Particularly useful is a dielectric stress control device or element which consists of a shaped body, preferably a sleeve, which can be placed onto an end of a cable insulation and/or shield. Stress control devices or elements having other geometric configurations may be useful to prevent unacceptably high local field concentrations, for example in break elbows, transition or throughgoing connections, feedthroughs and branchings of high-tension cables. In certain cable terminations, nonlinear resistive field grading tubes are used in combination with capacitive stress cones.

The electric field grading compositions can be provided as (e.g., shaped into) articles of any suitable form. For example, such electric field grading compositions may be molded or extruded into shaped articles of any form (e.g., flat sheets, multilayer tubing or sheathing, plugs, hollow cones). If provided as a pliable layer, or as a grease, wax, gel or mastic, the electric field grading composition may be shaped in the field as desired. In some embodiments, such an electric field grading composition may be provided as a layer of a multilayer electrical stress control device, with the thickness of a layer being designed as needed. For example, such a layer may be provided as part of a co-extruded annular article. In some embodiments, an article comprising such an electric field grading composition may be provided along with one or more ancillary devices, e.g., one or more connectors or terminations for an electric power cable.

The electric field grading compositions disclosed herein may be suitable for use in various electrical stress control applications such as splices and terminations, because of their ability to provide a reversible non-linear current-voltage relationship. Electric field grading compositions disclosed herein can, if desired, be repeatedly exposed to increasing and decreasing voltages and may exhibit similar (though not necessarily identical) behaviors each time as long as the voltage does not exceed the electric field grading composition's irreversible breakdown voltage.

The electric field grading compositions disclosed herein may be particularly suitable for use in voltage regulator applications, such as surge arresters, and/or in applications involving electrostatic discharge suppression. And, as mentioned, such electric field grading compositions can advantageously mitigate or reduce the effect of electrical stress and may be used, e.g., in terminations and connectors for electrical power cables. In some applications, the herein-disclosed electric field grading compositions may serve in combinations of these functions. Advantageously, in any such application, the electric field grading compositions may be able to function at higher voltage levels than have been achievable with other materials used in the art.

The multilayer electric field grading article may include a backing on which at least one of the first or second layers are disposed. Suitable backings may include polymer films (e.g., polycarbonate films, polyester films, polyimide films, polyamide films, polyolefin films, polyurethane films, or poly(ethylene-co-vinyl acetate) films); fabrics (e.g., woven, knitted, or nonwoven); and papers. Laminates of the foregoing may also be used. In some embodiments, the backing comprises a tape backing, optionally having a pressure-sensitive layer disposed thereon opposite the first and second layers.

The first and second layers, respectively, comprise first and second electric field grading compositions. Each layer has a respective voltage-dependent nonlinear electrical resistivity given by the following general formula:

$$I=kV^{\alpha}$$

wherein:

I is current in amperes;

k is a constant greater than 0;

V is applied voltage in volts, wherein V is between the onset voltage and the breakdown voltage, inclusive; and $\alpha$ is a real number greater than 1.

Each layer may exhibit the same or different voltage-dependent nonlinear electrical resistivity.

A discrete interface is formed by intimate contact of the first and second layers. Without wishing to be bound by theory, the present inventors believe that the interface is electrically-insulating in nature. Typically, the second layer is substantially coextensive with the first layer; however, this is not a requirement.

It is envisaged that one or more additional layers of additional respective field grading compositions, which may be the same as or different from at least one of the first or second electric field grading compositions, may be layered upon the second layer opposite the first layer, thereby forming addition respective interfaces between the additional layers and/or the second layer.

Multilayer electric field grading article may be applied directly onto a surface of a substrate, resulting in a composite article. Any solid substrate may be used; however, multilayer electric field grading articles according to the present disclosure are advantageously used on substrates that are conducting and preferably capable of carrying a substantial current load and high voltage. Examples include exposed power cables (e.g., cable splices and cable terminations), and interior surfaces of switch housings (e.g., gas insulator switch housings). Electric field grading compositions according to the present disclosure may also be useful in surge protectors due to their electric field switchable conductivity.

Figure 3:
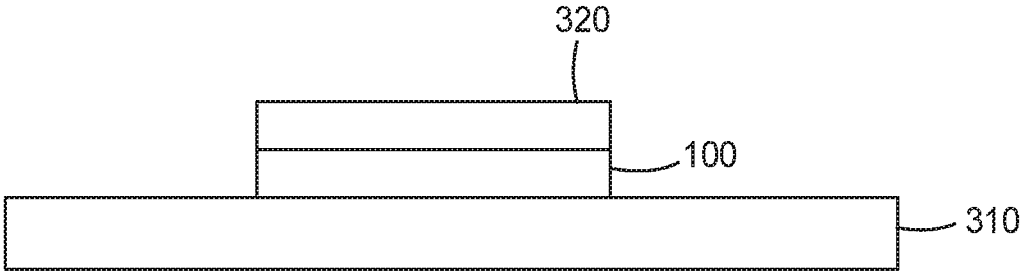
FIG. 3 is a schematic side view of an exemplary multilayer electric field grading article 100 disposed between a circuit board and an electronic component.

In one embodiment, shown in FIG. 3, multilayer electric field grading article 100 is disposed between circuit board 310 and electronic component 320.

Multilayer electric field grading articles of the present disclosure can be formed into various articles for various applications, for example, as a composite film, tape, or shaped body having a definite configuration. Particularly useful is a dielectric stress control device or element which consists of a shaped body, preferably a sleeve, which can be placed onto an end of a cable insulation and/or shield. Stress control devices or elements having other geometric configurations may be useful to prevent unacceptably high local field concentrations, for example in break elbows, transition or throughgoing connections, feedthroughs and branchings of high-tension cables. In certain cable terminations, electric field switchable resistive field grading tubes are used in combination with capacitive stress cones.

Multilayer electric field grading articles can be provided as (e.g., shaped into) articles of any suitable form. For example, such electric field grading compositions may be molded into shaped articles of any form (e.g., flat sheets, tubing or sheathing, plugs, hollow cones). If provided as a pliable layer, the multilayer electric field grading article may be shaped in the field as desired. In some embodiments, such an electric field grading composition may be provided as a layer(s) of a multilayer electrical stress control device, with the thickness of a layer being designed as needed. For example, such a layer may be provided as part of a co-extruded annular article. In some embodiments, a composite article comprising such a multilayer electric field grading article may be provided along with one or more ancillary devices, e.g., one or more connectors or terminations for an electric power cable.

The multilayer electric field grading articles disclosed herein may be suitable for use in various electrical stress control applications, because of their ability to provide a reversible non-linear current-voltage relationship. This reversibility is illustrated, for example, in FIG. 7, which shows a current vs. applied voltage curve both as the electric field increases and as it decreases. Electric field grading compositions disclosed herein can, if desired, be repeatedly exposed to increasing and decreasing voltages and may exhibit similar (although not necessarily identical) behavior each time as long as the voltage does not exceed the electric field grading composition's irreversible breakdown voltage.

The multilayer electric field grading articles disclosed herein may be particularly suitable for use in voltage regulator applications, such as surge arresters, and/or in applications involving electrostatic discharge suppression. And, as mentioned, such electric field grading compositions can advantageously mitigate or reduce the effect of electrical stress and may be used, e.g., in terminations and connectors for electrical power cables. In some applications, the herein-disclosed electric field grading compositions may serve in combinations of these functions.

SELECT EMBODIMENTS OF THE PRESENT DISCLOSURE

In a first embodiment, the present disclosure provides a multilayer electric field grading article comprising:

a first layer comprising a first electric field grading composition, the first electric field grading composition comprising first particles dispersed in a first matrix material, wherein the first layer has a first degree of nonlinearity that occurs between a first onset voltage and a first breakdown voltage;

a second layer disposed on the first layer and comprising a second electric field grading composition, the second electric field grading composition comprising second particles dispersed in a second matrix material, wherein the second layer has a second degree of nonlinearity that occurs between a second onset voltage and a second breakdown voltage, and wherein the second particles are compositionally different from the first particles; and a discrete interface formed by intimate contact of the first and second layers, wherein the first and second layers taken together have a combined voltage-dependent nonlinear electrical resistivity that occurs above a combined onset voltage that is higher than the first and second onset voltages, and wherein the first and second layers taken together have a greater combined degree of nonlinearity than each of the first and second degrees of nonlinearity taken individually.

In a second embodiment, the present disclosure provides a multilayer electric field grading article according to the first embodiment, wherein the second layer is substantially coextensive with the first layer.

In a third embodiment, the present disclosure provides a multilayer electric field grading article according to the first or second embodiment, wherein the multilayer electric field grading article is disposed on a major surface of a tape backing.

In a fourth embodiment, the present disclosure provides a multilayer electric field grading article according to any one of the first to third embodiments, wherein the first particles comprise $Fe_3O_4$.

In a fifth embodiment, the present disclosure provides a multilayer electric field grading article according to any one of the first to fourth embodiments, wherein the second particles comprise CuO.

In a sixth embodiment, the present disclosure provides a multilayer electric field grading article according to any one of the first to fifth embodiments, wherein the first electric field grading composition has a first onset voltage, a first breakdown voltage, and exhibits a first reversible electric field switchable current-voltage relationship that substantially follows the equation:

$$I_1=k_1V_1^{\alpha 1}$$

wherein:

$I_1$ is a first current in amperes;

$k_1$ is a constant greater than 0;

$V_1$ is a first applied voltage in volts, wherein $V_1$ is between the first onset voltage and the first breakdown voltage, inclusive; and $\alpha_1$ is a real number greater than 1.

In a seventh embodiment, the present disclosure provides a multilayer electric field grading article according to any one of the first to sixth embodiments, wherein the second electric field grading composition has a second onset voltage, a second breakdown voltage, and exhibits a second reversible electric field switchable current-voltage relationship that substantially follows the equation:

$$I_2=k_2V_2^{\alpha 2}$$

wherein:

$I_2$ is a second current in amperes;

$k_2$ is a constant greater than 0;

$V_2$ is a second applied voltage in volts, wherein $V_2$ is between the second onset voltage and the second breakdown voltage, inclusive; and $\alpha_2$ is a real number greater than 1.

In an eighth embodiment, the present disclosure provides a multilayer electric field grading article according to any one of the first to seventh embodiments, further comprising a third layer comprising the first electric field grading composition and intimately contacting the second layer opposite the first layer.

In a ninth embodiment, the present disclosure provides a multilayer electric field grading article according to any one of the first to eighth embodiments, wherein the multilayer electric field grading article comprises a termination or a splice.

In a tenth embodiment, the present disclosure provides a multilayer electric field grading article according to any one of the first to ninth embodiments, wherein the multilayer electric field grading article is disposed between a circuit board and an electronic component.

In an eleventh embodiment, the present disclosure provides a multilayer electric field grading article according to any one of the first to tenth embodiments, wherein at least one of the first or second electric field grading compositions further comprises a capacitive field grading particulate high dielectric permittivity ceramic material having a dielectric permittivity value greater than 50.

In a twelfth embodiment, the present disclosure provides a multilayer electric field grading article according to any one of the first to eleventh embodiments, wherein at least one of the first and second dielectric matrices comprises a silicone, epoxy, or ethylene-propylene-diene rubber.

In a thirteenth embodiment, the present disclosure provides a multilayer electric field grading article according to any one of the first to twelfth embodiments, wherein the second particles are present in an amount of from 5 to 80 percent by weight, based on the total weight of the second electric field grading composition.

In a fourteenth embodiment, the present disclosure provides a multilayer electric field grading article according to any one of the first to twelfth embodiments, wherein the first particles are present in an amount of from 30 to 80 percent by weight, based on the total weight of the first electric field grading composition.

In a fifteenth embodiment, the present disclosure provides a multilayer electric field grading article according to any one of the first to thirteenth embodiments, wherein the first or second layer is disposed on a tape backing.

In a sixteenth embodiment, the present disclosure provides a method of reducing electric field stress at a joint or termination of a conductive substrate, the method comprising applying the multilayer electric field grading article according to any one of the first to fourteenth embodiments to a surface of a conductive substrate.

In a seventeenth embodiment, the present disclosure provides a method according to the sixteenth embodiment, wherein the conductive substrate comprises an electric cable.

In an eighteenth embodiment, the present disclosure provides a method according to the sixteenth embodiment, wherein the conductive substrate comprises a housing, and wherein the surface of the conductive substrate comprises an interior surface of the housing.

In a nineteenth embodiment, the present disclosure provides a method according to the sixteenth embodiment, wherein the conductive substrate comprises at least a portion of an electrical cable splice, electrical cable termination, gas-insulated switchgear tank, surge arrester for electrostatic discharge protection, or a transformer insulation.

In a twentieth embodiment, the present disclosure provides a method according to the sixteenth embodiment, wherein the multilayer article comprises a device for protecting electrical equipment against transient electrical surges.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Electrical Properties Testing

The current/voltage (I-V) and DC electric field characteristics of specimens were determined using an automated and safety enclosed measurement setup consisting of a Keithley 6485 programmable picoammeter, a Keithley 2290-10 high voltage power supply and a USB-GPIB device which connected the picoammeter and power supply to a computer. The equipment was capable of applying an electrical potential across samples of up to 10 kilovolts (kV). The measurements were carried out using a step voltage ramp, where the current was measured at the end of each voltage step. All the measurements were done at room temperature.

Comparative Example A

A polydimethylsiloxane (PDMS) elastomeric matrix was used as the base matrix for making the composites. A mixture of PDMS elastomer base (SYLGARD 184 base, Dow Corning, Midland, Michigan) and curing agent (SYLGARD 184 silicone elastomer curing agent, Dow Corning) was placed into a small plastic container (9:1 weight ratio, respectively) along with the appropriate amount (72 wt. %) of cupric oxide (CuO, 98% purity, American Chemet Corp., Deerfield, Illinois) powder. A high-speed mixer (DAC 150 FVZ, Siemens) was used (2000 revolutions per minute (rpm) for 60 seconds) to disperse the CuO powder in the liquid silicone mixture. The resulting composition was then sandwiched between a pair of aluminum plates and the entire stack was placed into a Carver Laboratory Press (Model No. 2699, Carver, Inc., Wabash, Indiana). Aluminum plates (and spacers as needed) of a variety of different thicknesses were used. The press was used to apply a force of approximately 6 metric tons for thirty minutes while the temperature of the sample was increased to 100° C. The polymer composite samples were subsequently allowed to cool to room temperature before taking it out of the press and removal of the aluminum plates. The resulting composites were flexible solid sheets that were 1.5 mm in average thickness.

Figure 4:
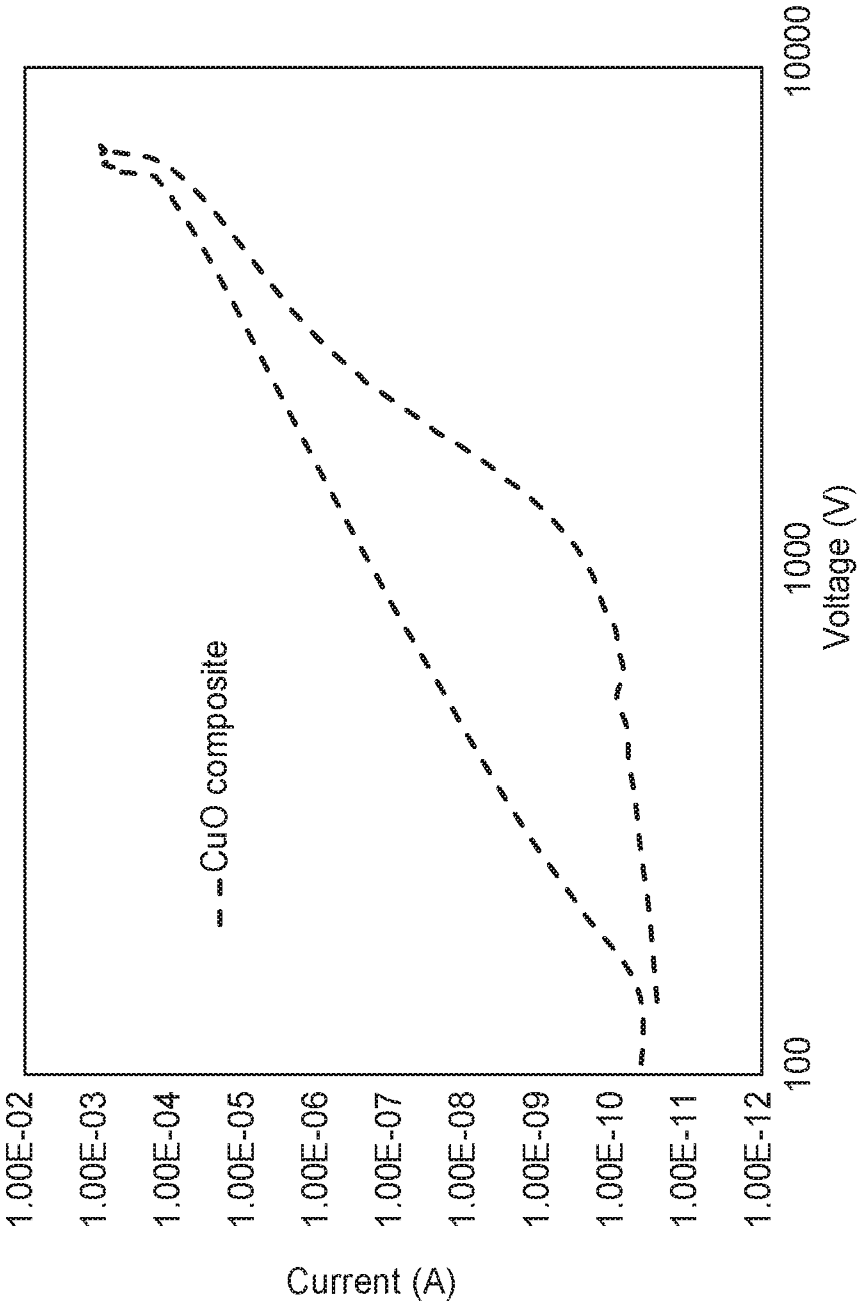
FIG. 4 is a plot of current versus applied potential (both in logarithmic scale) for Comparative Example A (CuO composite).

Results of electrical properties testing are shown in FIG. 4. A power law coefficient $\alpha$ of 7 to 10 was observed and the onset voltage was about 840 volts (V). The reversible nature of the current-voltage plot is evident.

Comparative Example B

Figure 5:
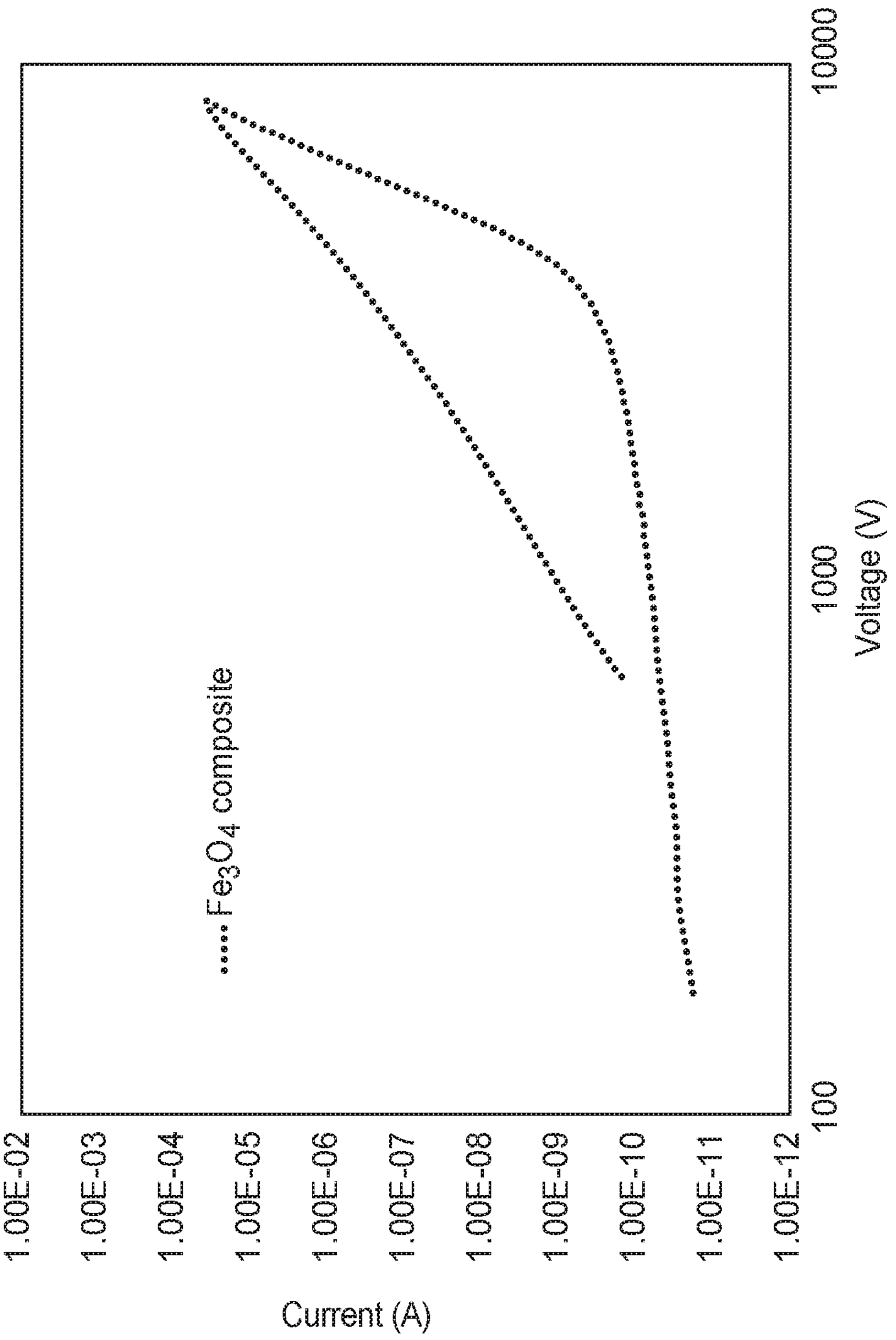
FIG. 5 is a plot of current versus applied potential (both in logarithmic scale) for Comparative Example B ($Fe_3O_4$ composite).

Comparative Example A was repeated except, that 36 wt. % of ferrosoferric oxide ($Fe_304$, 97%, Alfa Aesar, Tewksbury, Massachusetts) was used in place of the CuO. The composite was 1.5 mm in thickness similar to Comparative Example A. Results of electrical properties testing are shown in FIG. 5. A power law coefficient $\alpha$ of 12 to 15 was observed and the onset voltage was about 2465 V. Similar to example above, reversible nature of the current voltage plot is shown.

Example 1

An $Fe_3O_4$ (36 wt. %)/silicone composite layer was made as described in Comparative Example B and allowed to cure in the Al plate mold. Thickness of this composite was 0.75 mm. Instead of removing the composite layer, a CuO (72 wt. %)/silicone composite was fabricated on top of it, using the $Fe_3O_4$ (36 wt. %)/silicone layer as a template. The thickness of the top layer was also maintained at 0.75 mm. Thus, a multilayer structure with CuO composite layer on top and $Fe_3O_4$ composite layer on the bottom, having a total thickness of 1.5 mm was made.

Figure 6:
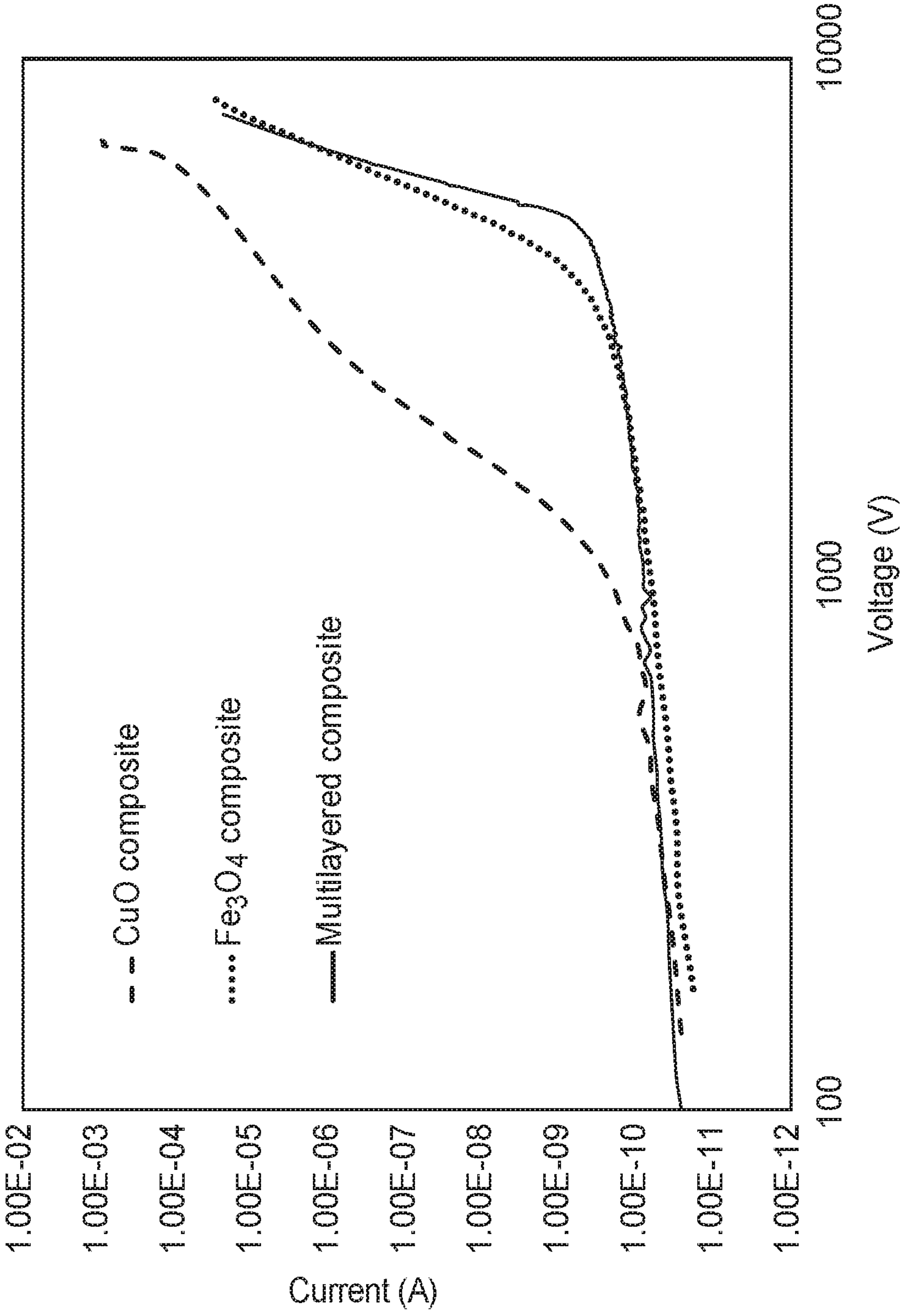
FIG. 6 is a plot of current versus applied potential (both in logarithmic scale) for Comparative Example A (CuO composite), Comparative Example B ($Fe_3O_4$ composite) and multilayered sample (CuO composite and $Fe_3O_4$ composite).
Figure 8:
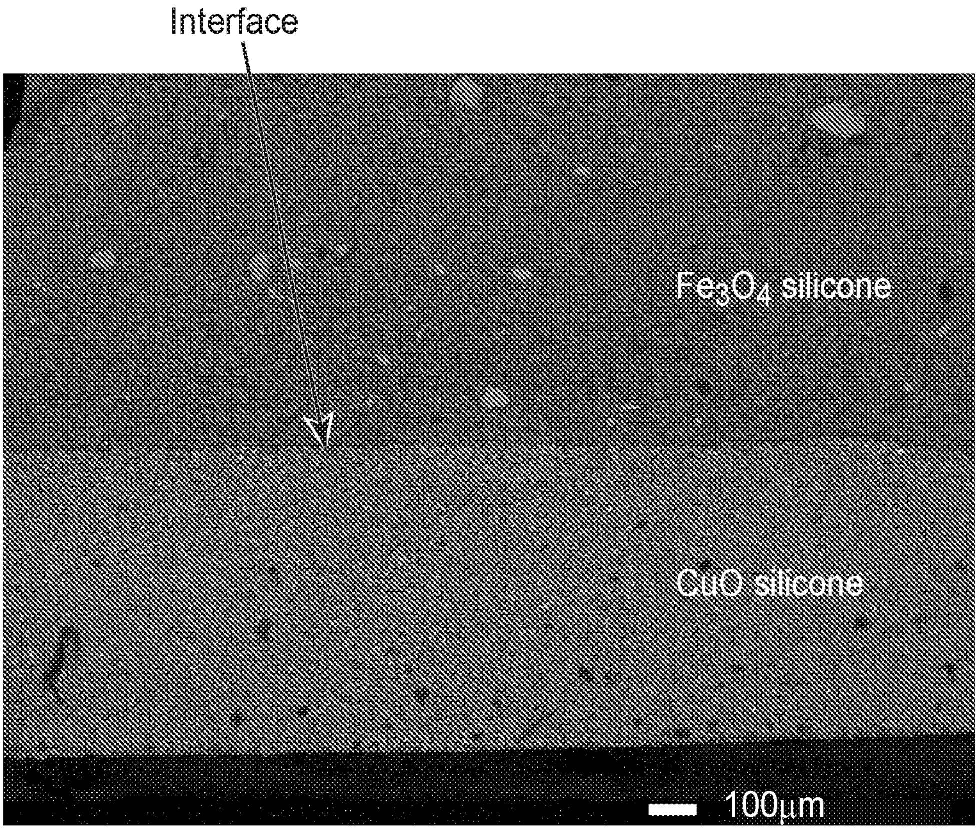
FIG. 8 is a SEM (Scanning Electron Microscope) image of the discrete interface between the two layers (CuO composite and $Fe_3O_4$ composite).

By visual inspection, a smooth interface with no apparent discontinuities was obtained for the multilayered structure. SEM of the sandwich structure with the discrete interface between the two compositionally different layers is shown in FIG. 8. Total thickness of the multilayered electric field grading article was 1.5 mm. Results of electrical properties testing of Example 1 and Comparative Examples A and B are shown in FIG. 6. For Example 1, a power law coefficient α of 20 to 23 was observed and the onset voltage was about 3790 V.

Figure 7:
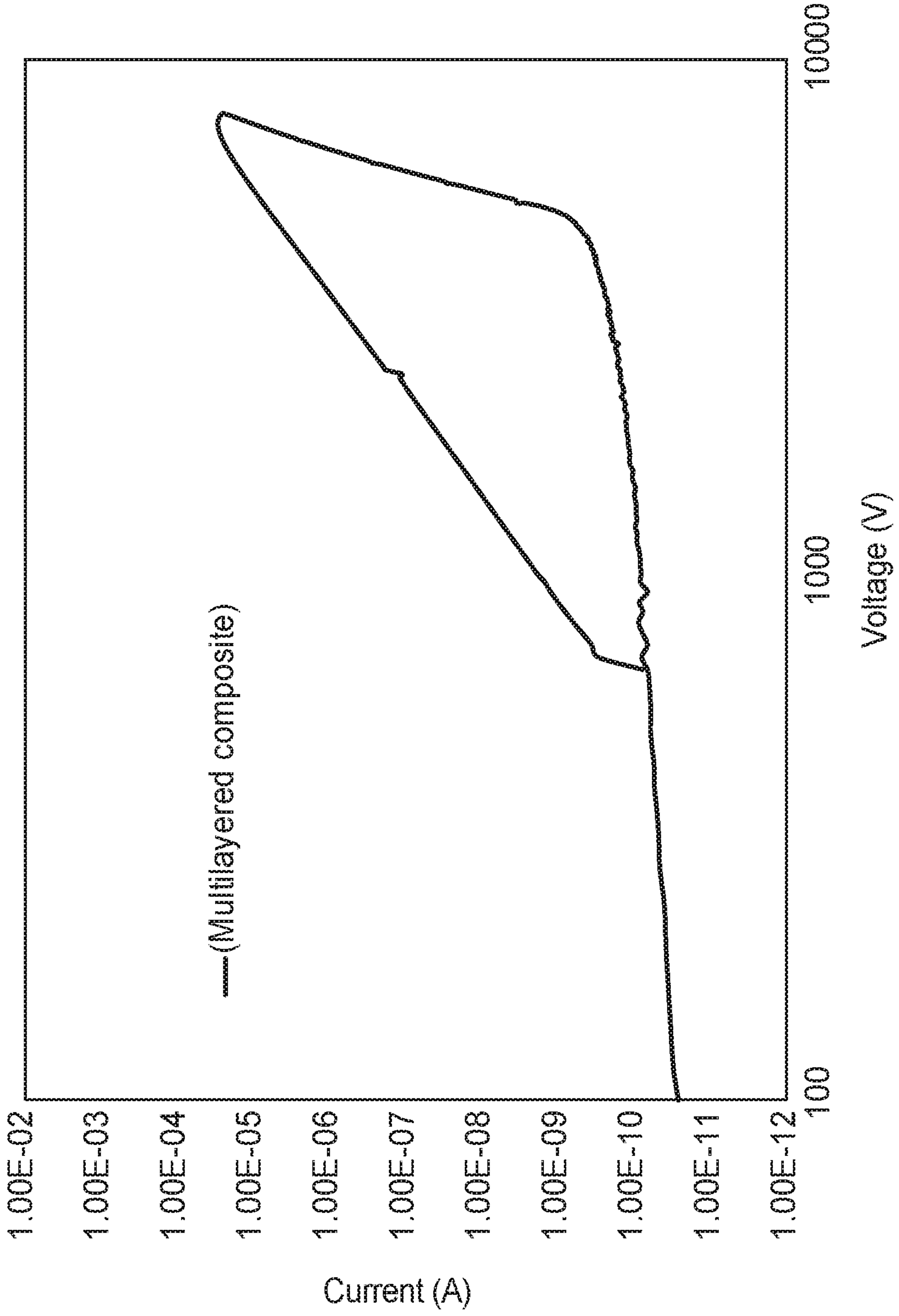
FIG. 7 is a plot of current versus applied potential (both in logarithmic scale) for multilayered sample (CuO composite and $Fe_3O_4$ composite) showing reversible current-voltage characteristics.

FIG. 7 shows the reversible nature of the multilayered composite (Example 1), demonstrating that reversibility of current vs. voltage is maintained for the multilayered construction.

Table 1 (below) summarizes the electrical properties of the various composites described in earlier sections.

TABLE 1

| ELECTRIC FIELD GRADING COMPOSITION | NONLINEAR REGIME ONSET VOLTAGE, V | POWER LAW COEFFICIENT, α | RANGE OF VOLTAGE LEVELS FOR NONLINEAR CHARACTERISTICS V |
|---|---|---|---|
| CuO (72 wt. %, 30 vol. %) in silicone (Comparative Example A) | 840 | 7-10 | 840-6400 |
| $Fe_3O_4$ (36 wt. %, 9.8 vol. %) in silicone (Comparative Example B) | 2465 | 12-15 | 2465-7500 |
| Multilayered CuO silicone / $Fe_3O_4$ silicone construction (Example 1) | 3790 | 20-23 | 3790-7900 |

All cited references, patents, and patent applications in this application that are incorporated by reference, are incorporated in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A multilayer electric field grading article comprising:

a first layer comprising a first electric field grading composition, the first electric field grading composition comprising first particles dispersed in a first matrix material, wherein the first layer has a first degree of nonlinearity that occurs between a first onset voltage and a first breakdown voltage;

a second layer disposed on the first layer and comprising a second electric field grading composition, the second electric field grading composition comprising second particles dispersed in a second matrix material, wherein the second layer has a second degree of nonlinearity that occurs between a second onset voltage and a second breakdown voltage, and wherein the second particles are compositionally different from the first particles; and a discrete interface formed by intimate contact of the first and second layers, wherein the first and second layers taken together have a combined onset voltage that is higher than the first and second onset voltages, and wherein the first and second layers taken together have a greater combined degree of nonlinearity than each of the first and second degrees of nonlinearity taken individually.

2. The multilayer electric field grading article of claim 1, wherein the second layer is substantially coextensive with the first layer.

3. The multilayer electric field grading article of claim 1, wherein the multilayer electric field grading article is disposed on a major surface of a tape backing.

4. The multilayer electric field grading article of claim 1, wherein the first particles comprise $Fe_3O_4$.

5. The multilayer electric field grading article of claim 1, wherein the second particles comprise CuO.

6. The multilayer electric field grading article of claim 1, wherein the first electric field grading composition has a first onset voltage, a first breakdown voltage, and exhibits a first reversible electric field switchable current-voltage relationship that substantially follows the equation:

$$I_1=k_1V_1^{\alpha_1}$$

wherein:

$I_1$ is a first current in amperes;

$k_1$ is a constant greater than 0;

$V_1$ is a first applied voltage in volts, wherein $V_1$ is between the first onset voltage and the first breakdown voltage, inclusive; and $\alpha_1$ is a real number greater than 1.

7. The multilayer electric field grading article of claim 1, wherein the second electric field grading composition has a second onset voltage, a second breakdown voltage, and exhibits a second reversible electric field switchable current-voltage relationship that substantially follows the equation:

$$I_2=k_2V_2^{\alpha_2}$$

wherein:

$I_2$ is a second current in amperes;

$k_2$ is a constant greater than 0;

$V_2$ is a second applied voltage in volts, wherein $V_2$ is between the second onset voltage and the second breakdown voltage, inclusive; and $\alpha_2$ is a real number greater than 1.

8. The multilayer electric field grading article of claim 1, further comprising a third layer comprising the first electric field grading composition and intimately contacting the second layer opposite the first layer.

9. The multilayer electric field grading article of claim 1, wherein the multilayer electric field grading article comprises a termination or a splice.

10. The multilayer electric field grading article of claim 1, wherein the multilayer electric field grading article is disposed between a circuit board and an electronic component.

11. The multilayer electric field grading article of claim 1, wherein at least one of the first or second electric field grading compositions further comprises a capacitive field grading particulate high dielectric permittivity ceramic material having a dielectric permittivity value greater than 50.

12. The multilayer electric field grading article of claim 1, wherein at least one of the first and second dielectric matrices comprises a silicone, epoxy, or ethylene-propylene-diene rubber.

13. The multilayer electric field grading article of claim 1, wherein the second particles are present in an amount of from 5 to 80 percent by weight, based on the total weight of the second electric field grading composition.

14. The multilayer electric field grading article of claim 1, wherein the first particles are present in an amount of from 30 to 80 percent by weight, based on the total weight of the first electric field grading composition.

15. The multilayer electric field grading article of claim 1, wherein the first or second layer is disposed on a tape backing.

16. A method of reducing electric field stress at a joint or termination of a conductive substrate, the method comprising applying the multilayer electric field grading article of claim 1 to a surface of the conductive substrate.

17. The method of claim 16, wherein the substrate comprises an electric cable.

18. The method of claim 16, wherein the conductive substrate comprises a housing, and wherein the surface of the conductive substrate comprises an interior surface of the housing.

19. The method of claim 16, wherein the substrate comprises at least a portion of an electrical cable splice, electrical cable termination, gas-insulated switchgear tank, surge arrester for electrostatic discharge protection, or a transformer insulation.

20. The method of claim 16, wherein the multilayer electric field grading article comprises a device for protecting electrical equipment against transient electrical surges.

* * * * *